United States Patent Office 3,051,753
Patented Aug. 28, 1962

3,051,753
ACTIVATORS FOR RHODIUM CATALYSTS
Andrew J. Dietzler and Theodore R. Keil, Midland, Mich., assignors to The Dow Chemical Company, Midland, Mich., a corporation of Delaware
No Drawing. Filed Dec. 29, 1958, Ser. No. 783,168
12 Claims. (Cl. 260—580)

This invention relates to processes for the catalytic hydrogenation of halonitroaromatic compounds to form the corresponding haloamino compounds.

It is well known that aromatic nitro compounds may be catalytically hydrogenated to produce the corresponding amino compounds. Heretofore however, such processes have been unsatisfactory for the preparation of haloamines because the halogen is usually removed from the aromatic compound by the hydrogenation step. Moreover, many hydrogenation catalysts are poisoned by the halonitro and/or the haloamino compounds. In attempting to avoid these difficulties, special catalysts have been proposed. For example, in Patent No. 2,772,313 the use of a specially prepared rhodium catalyst is disclosed. Such catalysts are slow and sometimes ineffective and, moreover, have not been generally useful in the production of many haloamines, especially bromoamines.

It is an object of this invention to provide processes for making haloamines, especially bromoamines, by the hydrogenation of aromatic halonitro compounds. Another object is to provide effective and inexpensive activators for the rhodium-catalyzed hydrogenation of halonitro aromatic compounds to form the corresponding haloamines. Other objects will appear hereinafter.

According to the invention, aromatic haloamines wherein the halogen has an atomic number below 36 are readily prepared from the corresponding halonitro compounds by hydrogenation in the presence of rhodium and calcium hydroxide.

The reaction of the invention may be conducted under the usual conditions suitable for the catalytic conversion of aromatic nitro groups to amino groups; i.e., at a temperature of about 20 to 100° C. and a hydrogen pressure of about 1 to 30 atmospheres. The time required for substantially complete reaction is usually about 1 to 24 hr. and is readily determined from the consumption of hydrogen. While ordinarily the reaction simply ceases when the nitro groups have all been reduced, and no substantial harm is done by prolonging the reaction period beyond that necessary, certain haloamines are sensitive to hydrogen under the more drastic reaction conditions and may be partially dehydrohalogenated if severe conditions and unduly long reaction times are used. In general, the bromo compounds are less stable than the corresponding chloro compounds while the fluoro compounds are more stable. The stability of the halogen substituent is highly dependent on the position and type of other substituents on the same benzene ring. Thus, it is highly activated by halogen, phenyl or, especially, hydroxyl substituents in the ortho or para position. Accordingly, when a nitro compound containing such an activated halogen substituent is to be hydrogenated, it is advisable to do so at the lowest practicable temperature and hydrogen pressure and to minimize the time during which the haloamine product is exposed to hydrogenation conditions.

Substantially any aromatic haloamine for which the corresponding nitro compound is available may be prepared by the present process. Haloamines that may be thus prepared include, for instance, the haloanilines, such as o-chloroaniline, m-bromoaniline, p-fluoroaniline, 2,3-, 2,4-, and 3,4-dichloroaniline, 2,5-dibromoaniline, 2,6-difluoroaniline and 2,3,5-trichloroaniline; the haloaminophenols, such as 3-bromo-, 3-chloro- or 3-fluoro-4-aminophenol, 2,3-dichloro-4-aminophenol, 3-chloro-5-aminophenol and 2-bromo-5-aminophenol; the halobiphenylamines, such as 4-fluoro-, 4-chloro- or 4-bromo-3-biphenylamine, 3-bromo-3'-biphenylamine, 3,5,4',5'-tetrachloro-3'-biphenylamine and 2,5-dichloro-3-fluoro-2'-biphenylamine; alkylhaloanilines, such as 2-fluoro-5-methylaniline, 3-chloro-5-sec.-butylaniline, 2-bromo-6-tert.-amylaniline, 3,4-dichloro-6-ethylaniline and 2-chloro-4-methyl-5-isooctylaniline; haloaminophenylaliphatic acids, such as 2-chloro-4-aminobenzoic acid, 3-bromo-5-aminobenzoic acid, 2,6-dichloro-3-aminobenzoic acid, 3-chloro-5-aminophenylacetic acid, 2,4-dichloro-5-aminophenoxy acetic acid, 2(2,4,5-trichloro-6-amino-phenoxy)propionic acid and 3-fluoro-4-phenyl-5-aminobenzoic acid; and the like.

The term "haloaniline," as used herein, refers to and includes substituted haloanilines wherein the substituent is on the same benzene ring as the amino group of the aniline; thus including, for instance, alkylhaloanilines, phenylhaloanilines, (substituted phenyl)haloanilines, carboxyl-substituted haloanilines, hydroxyl-substituted haloanilines, and the like.

In carying out the process of the invention, the nitro compound to be reduced may be dissolved in a suitable inert solvent, such as methanol or other lower alkanol; an aromatic hydrocarbon, such as benzene, toluene, xylene, cumene or cymene; an ether, such as diethyl, diisopropyl, phenyl methyl or diphenyl ether, tetrahydrofuran, ethoxyethanol, diglycol dimethyl ether and the like. The prefered solvents are those in which water is readily soluble, such as the lower alkanols and ketones. The use of a solvent, however, is not necessary and frequently satisfactory results may be obtained by hydrogenating the undiluted nitro compound. The proportions of nitro compound, catalyst and promoter are noncritical, the optinum proportions being readily determined by experiment. Obviously, the higher the ratio of catalyst to nitro compound, the more rapid the reaction. Usually about 0.0001 to 0.01 part, by weight, of finely divided rhodium is used per part of nitro compound. The amount of promoter is usually based on the amount of rhodium used and may suitably be about 0.01 to 6.0 part, by weight, per part of rhodium.

A general procedure that has been found satisfactory comprises placing the nitro compound, catalyst and promoter, with or without a solvent, in a reactor, displacing the air therein with hydrogen, sealing the reactor and agitating the contents while maintaining a hydrogen pressure of about 1 to 30 atmospheres and a temperature of about 20 to 100% C. until the theoretical absorption of hydrogen has occurred, this usually requiring about 1 to 24 hours. The pressure is then adjusted to atmospheric, the contents are removed from the reactor, the catalyst is separated by filtration of decantation, the solvent, if any, is distilled from the product and the latter is isolated and purified by any suitable method, such as distillation or crystallization. The catalyst usually retains its activity and may be reused indefinitely. In contrast, if the promoter is omitted the catalyst frequently loses much or all of its activity in a single use.

The practice of the invention is illustrated by the following examples.

EXAMPLE 1

*Effect of Calcium Hydroxide on the Activity of Rhodium Catalyst*

(a) Without Ca(OH)$_2$: 30.3 g. (0.15 moles) of 1-bromo-3-nitrobenzene, 150 cc. of methyl alcohol and 1.5 g. of 5% rhodium on alumina were combined in a 500 cc. Parr hydrogenator bottle. The air was evacuated from the bottle and the mixture agitated under a hydrogen pressure of 25–45 p.s.i.g. at 25–37° C. for 7 hours.

The reaction mixture was let stand to settle the catalyst.

The clear solution was decanted and the catalyst washed with methyl alcohol. Washings were added to the main reaction mixture. This solution was distilled.

After methanol and water had been removed there was added 0.55 g. of NaOH and distillation continued to produce a water-white liquid, m-bromoaniline; B.P., 114–120° C./10 mm.; F.P. 8.5° C.; yield, 87%.

(b) With Ca(OH)$_2$ additive 30.3 g. (0.15 mole) of 1-bromo-3-nitrobenzene, 150 cc. of methyl alcohol, 3 g. of the same catalyst used above and 0.3 g. of Ca(OH)$_2$ were combined in a 500 cc. Parr hydrogenator bottle and agitated at a hydrogen pressure of 20–40 p.s.i.g. and 22–40° C. In 4.5 hr. the theoretical amount (0.45 moles) of hydrogen was absorbed. Isolation of the product as in (a), above, resulted in an 86% yield of m-bromoaniline having a F.P. of 14.1° C., it being of much higher quality than that produced in (a), above.

EXAMPLE 2

*Hydrogenation of 4-Bromo-3-Nitrobiphenyl*

13.9 g. (0.05 moles) of 4-bromo-3-nitrobiphenyl, 125 cc. of methyl alcohol, 0.3 g. Ca(OH)$_2$ and 1.5 g. of 5% rhodium on alumina were combined and the mixture hydrogenated at 33.5–45 p.s.i.g. hydrogen pressure and 25–37° C. The theoretical amount of hydrogen was absorbed in 54 minutes. The reaction mixture was worked up as in the previous example. The yield of product, M.P. 91.3–92.8° C., was 69.4%. Two grams of this product recrystallized from aqueous methanol gave 1.6 g. of material, M.P. 95–96° C.

EXAMPLE 3

*Preparation of 4-Amino-3-Bromophenol*

(a) Without added Ca(OH)$_2$: 21.8 g. (0.1 mole) of 3-bromo-4-nitrophenol, M.P. 135°–136° C., 125 cc. of methanol, and 1 g. of 5% rhodium on alumina were combined and mixture hydrogenated at 25–48 p.s.i.g. hydrogen pressure at about 25° C., 1.75 hours being required. There was obtained a yield of 71.4% of 4-amino-3-bromophenol, M.P. 151–152.4° C.

(b) With added Ca(OH)$_2$: Experiment (a) above was repeated but 0.3 g. of Ca(OH)$_2$ was added. The hydrogenation was completed in 26 minutes at 25–28 p.s.i.g. hydrogen pressure at about 25–35° C. From this run a yield of 71.4% of 4-amino-3-bromophenol, M.P. 150.5–151° C. was obtained.

EXAMPLE 4

*Preparation of 3,4-Dichloroaniline*

(a) Without added Ca(OH)$_2$: 28.8 g. (0.15 mole) of 1,2-dichloro-4-nitrobenzene, F.P. 40.3° C., 150 cc. of methanol, and 1 g. of 5% rhodium on alumina were combined and hydrogenated at 25–48 p.s.i.g. hydrogen pressure and at about 25° C. 16 hours being required. From this run was obtained an 89.2% yield of 3,4-dichloroaniline having a M.P. of 68.0–70.4° C.

(b) With added Ca(OH)$_2$: When the experiment of (a), above was repeated with the addition of 0.3 g. of Ca(OH)$_2$, the reaction was completed in 5.1 hr. at a pressure of 24–43 p.s.i.g. and a temperature of 25° C. There was obtained a yield of 87.7% of product having a M.P. of 73.5–74.8° C.

While methanol was used as an inert diluent in the above examples, other inert solvents, as hereinbefore set forth, may be used likewise, or the hydrogenation may be conducted without use of any solvent.

Likewise, the halonitrobenzenes used in the above examples may be replaced with any of a great variety of halonitrobenzenes wherein the benzene ring may contain as substituent groups, fluorine, bromine, chlorine, alkyl, phenyl, substituted phenyl, hydroxyl, carboxyl, carboxyalkyl, or, in general, any substituent group that is less reactive to catalytic hydrogenation than is the nitro group.

The rhodium catalyst used in the above examples was a commercial product but other forms of rhodium having a highly extended surface may be used. Likewise, it may be supported on other inert solid carriers or in the absence of carriers.

We claim:

1. In a process for producing an aromatic primary haloamine wherein the halogen has an atomic number below 36 comprising hydrogenating the corresponding nitro compound at a temperature of about 20 to 100° C. and a hydrogen pressure of about 1 to 30 atmospheres and in the presence of a catalytic amount of rhodium, the improvement consisting of conducting the hydrogenation in the presence of calcium hydroxide.

2. A process as defined in claim 1 wherein the amine is a haloaniline.

3. A process as defined in claim 1 wherein the amine is a bromoaniline.

4. A process as defined in claim 1 wherein the amine is a chloroaniline.

5. A process as defined in claim 1 wherein the amine is a haloaminophenol.

6. A process as defined in claim 1 wherein the amine is a halobiphenylamine.

7. In a process for converting a halonitrobenzene compound, wherein the halogen has an atomic number below 36, to the corresponding haloaniline comprising hydrogenating the nitro compound at a temperature of about 20 to 100° C. and a hydrogen pressure of about 1 to 30 atmospheres and in the presence of a catalytic amount of finely divided metallic rhodium, the improvement consisting of conducting the hydrogenation in the presence of calcium hydroxide.

8. A process as defined in claim 7 wherein the halonitrobenzene compound is 3-bromo-nitrobenzene.

9. A process as defined in claim 7 wherein the halonitrobenzene compound is 3,4-dichloronitrobenzene.

10. A process as defined in claim 7 wherein the halonitrobenzene compound is 2,5-dibromonitrobenzene.

11. A process as defined in claim 7 wherein the halonitrobenzene compound is 3-bromo-4-nitrophenol.

12. A process as defined in claim 7 wherein the halonitrobenzene compound is 4-bromo-3-nitrobiphenyl.

References Cited in the file of this patent

UNITED STATES PATENTS

| | | |
|---|---|---|
| 2,105,321 | Henke | Jan. 11, 1938 |
| 2,164,154 | Henke | June 27, 1939 |
| 2,772,313 | Trager | Nov. 27, 1956 |
| 2,823,235 | Graham et al. | Feb. 11, 1958 |